United States Patent [19]

Thevenon

[11] Patent Number: 4,645,344
[45] Date of Patent: Feb. 24, 1987

[54] OPTICAL DEVICE FOR AN EMISSION SPECTROMETER

[75] Inventor: Alain Thevenon, Bretigny, France

[73] Assignee: Instruments, S.A., France

[21] Appl. No.: 759,927

[22] Filed: Jul. 26, 1985

Related U.S. Application Data

[63] Continuation of Ser. No. 452,477, Dec. 23, 1982, abandoned.

[30] Foreign Application Priority Data

Jan. 5, 1982 [FR] France ................................ 82 00062

[51] Int. Cl.$^4$ ............................. G01J 3/04; G01J 3/20
[52] U.S. Cl. ................................................... 356/328
[58] Field of Search ............... 356/300, 303, 306, 313, 356/326, 328

[56] References Cited

U.S. PATENT DOCUMENTS 4,340,303 7/1982 Grisar et al. ......................... 356/313

FOREIGN PATENT DOCUMENTS 1050528 12/1966 United Kingdom ................ 356/300

Primary Examiner—F. L. Evans
Attorney, Agent, or Firm—Handal & Morofsky

[57] ABSTRACT

An optical device having a Paschen-Runge mounting arrangement, suitable for splitting up the polychromatic light emitted when the sample to be analyzed is being excited, comprising a frame (1) having the shape of a circle sector, an inlet slit (21) illuminated by polychromatic light, a concave diffraction grating (4) which diffracts the bundle of polychromatic light coming from the inlet slit, outlet slits (51) worked into a slit-carrier (5) and selecting the monochromatic bundles coming from the grating, and detectors for measuring the light fluxes of the monochromatic bundles. The slit-carrier (5) consists of a flexible continuous metal ribbon, and the cylindrical support bearings (122), which serve as supports for the slit-carrier, form part of the frame and are situated on either side of an aperture for the passage of monochromatic bundles, the ends of this ribbon being fixed to the frame (1). The device is intended to be mounted in a direct reading emission spectrometer.

5 Claims, 1 Drawing Figure

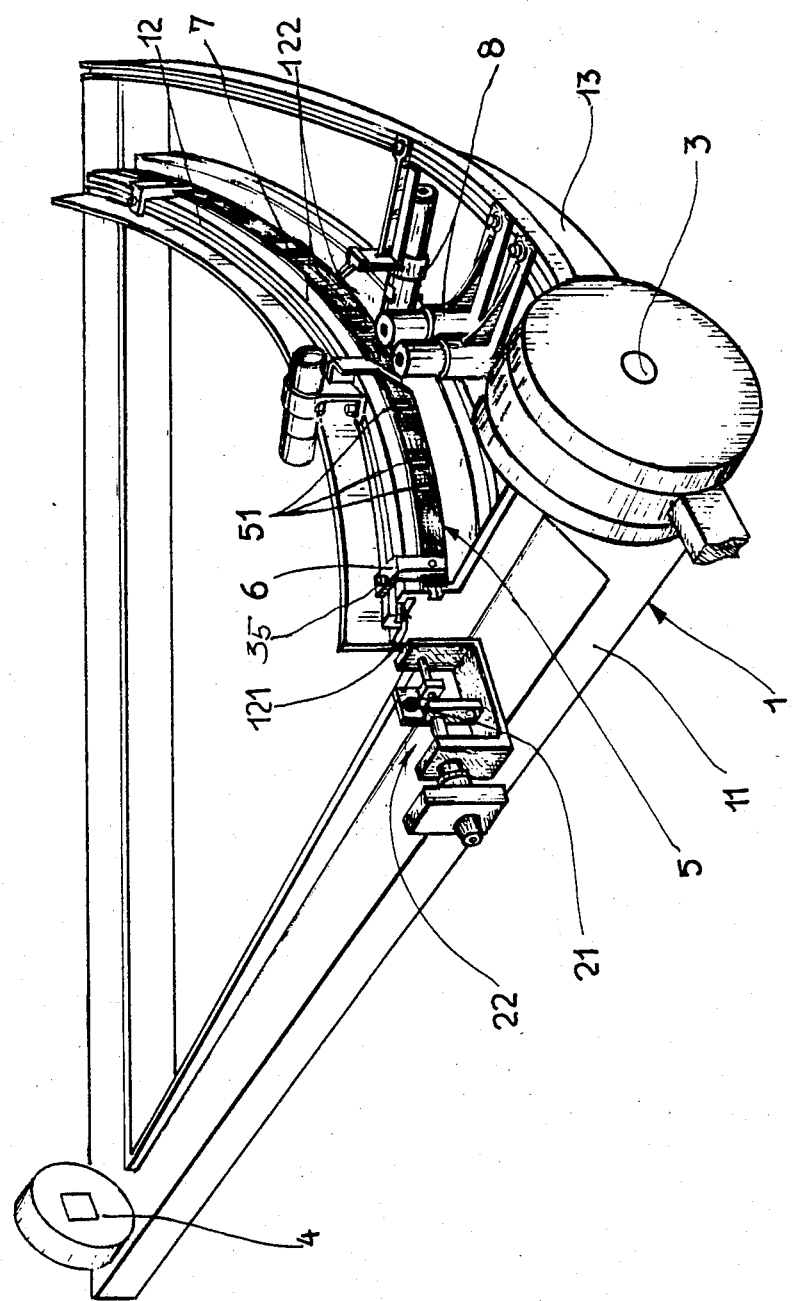

OPTICAL DEVICE FOR AN EMISSION SPECTROMETER

This application is a continuation of application Ser. No. 452,477, filed Dec. 23, 1982, abandoned.

FIELD OF THE INVENTION

The present invention relates to an optical device having a Paschen-Runge mounting arrangement, suitable for splitting up polychromatic light emitted when the sample to be analyzed is being excited. This optical device is intended to be mounted in a direct reading emission spectrometer.

BACKGROUND OF THE INVENTION

An optical device having a Paschen-Runge mounting arrangement comprises a concave diffraction grating which receives through an inlet slit the polychromatic light emitted by the excitation of the sample to be analyzed. The inlet slit is placed onto the Rowland circle which is tangential to the concave spherical surface on which the grating is formed and which has a diameter equal to the radius of curvature of that surface. The monochromatic bundles, supplied by the grating, converge in points situated on the Rowland circle. The chosen wavelengths are selected by the outlet slits placed on the Rowland circle.

In the Paschen-Runge mounting arrangements, the slits, placed on the Rowland circle, are generally mounted individually onto a rigid slit-carrier which can be regulated, relative to the frame. This fitting is not well adapted for regulating the outlet slits.

SUMMARY OF THE INVENTION

The subject of the present invention is an optical device for a spectrometer, using the Paschen-Runge mounting arrangement, in which regulation of the slit-carrier can be easily brought about.

The device according to the invention comprises, on a frame in the shape of a circle sector, an inlet slit illuminated by polychromatic light, a concave diffraction grating which diffracts the bundle of polychromatic light coming from the inlet slit, outlet slits worked into a slit-carrier for selecting the monochromatic bundles coming from the grating and detectors for measuring the light fluxes of the said monochromatic bundles, the inlet slit, the diffraction grating and the outlet slits being placed on the Rowland circle, wherein essentially the slit-carrier consists of a flexible continuous metal ribbon and wherein the cylindrical support bearings, which serve as supports for the slit-carrier, form part of the frame and are situated on either side of an aperture for the passage of monochromatic bundles, the ends of this ribbon being fixed to the frame.

According to one aspect of the invention, the ends of the ribbon are fixed by means for regulating its position and its tension. According to another aspect, the ribbon is made of two parts, connected to each other by a connecting piece.

BRIEF DESCRIPTION OF THE DRAWING

The invention will now be described in greater detail with reference to an embodiment given by way of example and shown in the attached drawing.

The single FIGURE is an overall view of the device according to the invention.

DETAILED DESCRIPTION

With reference to the FIGURE, the device comprises a metal frame 1, having a general shape of a circle sector. This single-block frame is made up of two branches 11 which form a V and are joined by one or more rails 12, 13, having the shape of circle arcs.

The device comprises an inlet slit 21 which forms part of a mounting arrangement with a screw regulator 22 which is carried by the frame. The inlet slit receives, through the objective 3, the bundle of polychromatic light emitted by the excited sample.

The bundle passing through the inlet slit is received by a diffraction grating 4, formed on a concave spherical surface. This grating is mounted in a support which is fixed to the apex of the V formed by the frame. It splits up the bundle of polychromatic light into several monochromatic bundles, producing images of the inlet slit which are located on the Rowland circle passing through the inlet slit and tangential to the grating, the diameter of this circle being equal to the radius of curvature of the spherical surface carrying the lines of the grating. The rail 12 of the frame forms an aperture or window, into which the monochromatic bundles pass. Moreover, this rail forms cylindrical support bearings 122, which are situated on either side of this aperture and which surround a cylinder passing through the Rowland circle.

The outlet slits 51 are worked into a slit-carrier 5 which covers the whole of the wavelengths selected from the spectrum supplied by the grating. This slit-carrier consists of a flexible metal ribbon which is held at its ends so as to be in contact with the cylindrical bearings 122 of the frame which serve for guiding it along the Rowland circle. The ends of the slit-carrier ribbon are attached to two bars, held in fixed position by a screw and nut system 35 in a groove 121 of the rail 12. Each bar 6 comprises a screw-nut which enables the position of the ribbon 5 to be regulated along the Rowland circle and the tension to be regulated.

The ribbon is formed by two parts, connected to each other by a connecting piece 7 which acts as a tightener. The ribbon is made, by electrodeposition, of nickel, the dilation coefficient of which is close to that of foundry metal or of some other metal, by a suitable manufacturing process.

After passing through the outlet slits 51, the monochromatic bundles are guided, directly or by way of mirrors, onto detectors 8, consisting of photomultipliers which measure the light fluxes of these bundles. The detectors 8 are mounted on rails 12 and 13.

I claim:

1. An optical device having a Paschen-Runge arrangement for an emission spectrometer, comprising a frame, an inlet slit mounted on said frame to be illuminated by a bundle of polychromatic light, a concave diffraction grating mounted on said frame for diffracting a bundle of polychromatic light coming from said inlet slit and producing a number of monochromatic bundles at outlet points, outlet slit means for selecting said monochromatic bundles at said points, said outlet slit means being supported by cylindrical support bearings and two bar means, securing means holding said bar means in position, a flexible two part metal ribbon which defines said outlet slits at said points, said ribbon comprising two ribbon parts each connected, at one end thereof, to its respective bar means, said ribbon parts being connected, at their other ends, to each other by a tightening connection means, said inlet and outlet slits being located on the Rowland circle which is tangential to the diffraction grating.

2. An optical device having a Paschen-Runge arrangement for an emission spectrometer, comprising:
  (a) a frame;
  (b) an inlet slit mounted on said frame and positioned to receive a bundle of polychromatic light;
  (c) a concave diffraction grating mounted on said frame and positioned to receive said bundle of polychromatic light coming from said inlet slit for diffracting said polychromatic light into a number of monchromatic bundles;
  (d) support bearings mounted on said frame and defining a support path substantially coincident with the Rowland circle tangent to and defined by said diffraction grating;
  (e) first and second bar means including means for mounting said bar means at various points along a path substantially coincident with the path defined by said support bearing;
  (f) first and second securing means associated with said first and second bar means, respectively, for securing its respective bar means at various selectable points;
  (g) a first flexible ribbon part mounted in said support bearing, one end of said first ribbon part being connected to said first bar means;
  (h) a second ribbon part mounted in said support bearing, one end of said second ribbon part being connected to said second bar means; and
  (i) tightening connection means for connecting the other end of said second ribbon part to the other end of said first flexible ribbon part, said first and second ribbon parts defining at least one outlet slit.

3. A device as claimed in claim 2, wherein said bar means are held in position by a screw and nut system in a groove defined by said frame.

4. A device as claimed in claim 3, wherein said ribbon parts are made of nickel.

5. A device as in claim 3, further comprising an objective lens mounted on said frame for illuminating said inlet slit with said polychromatic bundle.

* * * * *